United States Patent [19]

Igarashi

[11] Patent Number: 4,644,441

[45] Date of Patent: Feb. 17, 1987

[54] DISCHARGE-TYPE ARRESTER

[75] Inventor: Yoshio Igarashi, Tokyo, Japan

[73] Assignee: Kabushiki Kaisha Sankosha, Tokyo, Japan

[21] Appl. No.: 637,139

[22] Filed: Aug. 3, 1984

[30] Foreign Application Priority Data

Sep. 22, 1983 [JP] Japan ............................... 58-145925

[51] Int. Cl.$^{4}$ ............................................... H02H 9/06

[52] U.S. Cl. ..................................... 361/120; 361/129

[58] Field of Search ............... 361/119, 120, 124, 129, 361/117; 313/170, 306, 325, 581, 602

[56] References Cited

U.S. PATENT DOCUMENTS

| | | | |
|---|---|---|---|
| 3,651,380 | 3/1972 | Peche et al. | 361/120 |
| 3,710,191 | 1/1973 | Peche | 361/120 |
| 3,739,230 | 6/1973 | Lange | 361/120 |
| 3,780,350 | 12/1973 | Sanger et al. | 361/120 X |
| 3,811,064 | 5/1974 | Kawiecki | 361/120 X |
| 4,104,693 | 8/1978 | Toda et al. | 361/120 |
| 4,321,649 | 3/1982 | Gilberts | 361/119 |
| 4,393,433 | 7/1983 | Anderson et al. | 361/120 X |
| 4,433,354 | 2/1984 | Lange et al. | 361/120 |
| 4,491,893 | 1/1985 | Toda | 361/120 |
| 4,493,004 | 1/1985 | Lange et al. | 361/129 X |
| 4,493,006 | 1/1985 | Lange et al. | 361/119 X |

FOREIGN PATENT DOCUMENTS 2085222 4/1982 United Kingdom ................ 361/120

*Primary Examiner*—Peter S. Wong
*Assistant Examiner*—Marc S. Hoff
*Attorney, Agent, or Firm*—Schwartz, Jeffery, Schwaab, Mack, Blumenthal & Evans

[57] ABSTRACT

A pair of main electrodes are airtightly attached to their corresponding end openings of an insulating cylinder so that their discharge surfaces are opposed to each other with a gap between them in the insulating cylinder. An intermediate electrode is airtightly attached to the central portion of the insulating cylinder so that its discharge surface coaxially surrounds the space between the discharge surfaces of the main electrodes and faces the lateral faces of the main electrodes to define the discharge gaps. Electrode activators are contained in cavities or grooves in or on the main electrodes so as to be isolated from the discharge surfaces thereof, or are arranged on one of the respective discharge surfaces of the main and intermediate electrodes. When the arrester performs a continuous discharging operation, the electrodes without electrode activators thereon are melted by the heat generated by a discharged current, thereby short-circuiting the main and intermediate electrodes to establish an electrode short-circuit mode. Thus, open breakage, attributed to the burning of the arrester and its holder, may be avoided.

5 Claims, 2 Drawing Figures

DISCHARGE-TYPE ARRESTER

BACKGROUND OF THE INVENTION

This invention relates to a discharge-type arrester and, more specifically, to a discharge-type arrester which comprises a pair of cylindrical main electrodes set in an insulating cylinder and an intermediate electrode coaxially surrounding a discharge gap between the main electrodes and coupled to the main electrodes through the discharge gaps. The invention can be applied to an arrester of a gas-filled gap type having at least one ignition conductor extending over part of the inner wall surface of the insulating cylinder along the longitudinal direction thereof.

As stated in, e.g., U.S. Pat. No. 4,187,526, the gas-filled gap type arrester has an advantage such that when one of the discharge gaps is activated, a common discharge chamber is ionized, thereby activating the other discharge gap without any time lag. Because they are high in insulating capability, free from leakage current, increased in discharge withstand current rating, and small in size, the arresters of this type are widely used as surge-protection arresters for, e.g., communication apparatuses.

However, the prior art gas-filled gap type arresters cannot fulfill all the requirements of the heavy duty standards, especially those in the United States.

An arrester stated in West German Pat. No. 3,100,924 is known as one of the gas-filled gap type arresters which comply with the U.S. heavy duty standards.

In the gas-filled gap type arrester stated in West German Pat. No. 3,100,924, a pair of main electrodes with inward steps thereon is formed into a double cylinder, and an intermediate electrode defining discharge gaps with the main electrodes is formed of a hollow cylinder which has a skirt-shaped section. Also, electrode activators formed of a metal oxide such as magnesium oxide are provided on the overlapping portions of the main and intermediate electrodes. Thus, the arrester can maintain satisfactory electrical properties against a surge current load and an AC current load during the period of its life.

In the prior art gas-filled gap type arrester, heat energy produced by the discharging operation is generally small for a lightning surge with a short discharge time, so that the arrester will not be heated to a high temperature. For an inductive surge from a power line requiring a relatively long arrester discharge time, however, the arrester is heated to a high temperature by substantial heat energy produced by the discharging operation.

Thus heated to a high temperature by the high-temperature heat energy, the arrester and its holder will be burned, possibly causing a serious accident.

In order to prevent such an accident and to securely ground the surge, one of the main electrodes of the prior art gas-filled gap type arrester is covered with a cup-shaped short bar by means of a disk fuse (low-melting-point alloy). The disk fuse is melted by discharged heat generated by the continuous discharge of the arrester, thereby moving the short bar toward the other main electrode to short-circuit the two main electrodes, that is, to establish the so-called short-circuit mode. Thus, the arrester is prevented from being burned by the heat attributed to the discharged current.

In the aforementioned conventional arrangement, however, the use of the cup-shaped short bar, covering the one electrode of the arrester, leads to an increased number of components and an increase in the overall size of the arrester, thus requiring a special case for the arrester. Possibly soiled by the melted fuse, moreover, the arrester case and other components need replacement.

SUMMARY OF THE INVENTION

An object of this invention is to provide a discharge-type arrester capable of preventing burning of the arrester and its holder, attributed to the prolonged flow of discharged current therein, thereby securely avoiding accidents due to such burning.

Another object of the invention is to provide a discharge-type arrester capable of performing a discharging operation without a start delay when surge voltage and AC overvoltage are applied.

Still another object of the invention is to provide a discharge-type arrester improved in the insulation efficiency between the main electrodes to be freed of current leakage, increased in discharge withstand current rating, and reduced in overall size.

According to one aspect of the invention, there is provided a discharge-type arrester which comprises an insulating cylinder, a pair of cylindrical main electrodes airtightly attached to their corresponding openings of the insulating cylinder so that the inner end faces of the main electrodes are opposed to each other to form discharge surfaces which define a discharge gap in the insulating cylinder, an intermediate electrode having a discharge surface coaxially surrounding the space between the discharge surfaces of the main electrodes and facing the lateral faces of the main electrodes to define the discharge gaps, and electrode activators arranged on the intermediate electrodes so as to be isolated from the respective discharge surfaces of the main electrodes.

According to another aspect of the invention, there is provided a discharge-type arrester which comprises an insulating cylinder, a pair of cylindrical main electrodes airtightly attached to their corresponding openings of the insulating cylinder so that the inner end faces of the main electrodes are opposed to each other to form discharge surfaces which define a discharge gap in the insulating cylinder, an intermediate electrode having a discharge surface coaxially surrounding the space between the discharge surfaces of the main electrodes and facing the lateral faces of the main electrodes to define the discharge gaps, and electrode activators arranged on the respective discharge surfaces of the main electrodes and the intermediate electrode.

According to this invention, when the arrester performs a continuous discharging operation, an electrode or electrodes with no electrode activators thereon are melted by the use of heat generated by a discharged current, thereby short-circuiting the main and intermediate electrodes to establish an electrode short-circuit mode. Thus, the arrester and its holder are prevented from being burned by the inflow of a surge with a relatively long discharge time.

DETAILED DESCRIPTION OF THE PREFERRED EMBODIMENTS

Figure 1:
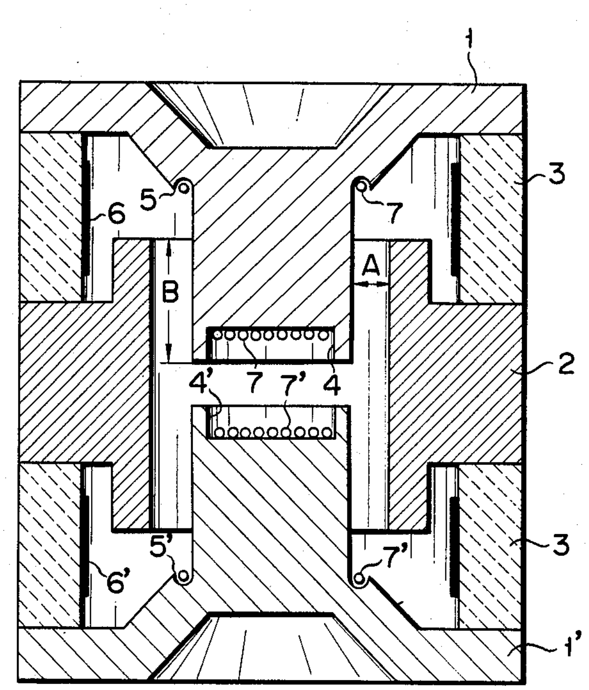
Fig. 1 is a vertical sectional view showing the construction of a gas-filled gap type arrester according to one embodiment of this invention.

Referring now to FIG. 1, there are shown a pair of cylindrical main electrodes 1 and 1′, an intermediate electrode 2, an insulating cylinder 3 formed of ceramics or glass, cavities 4 and 4′, grooves 5 and 5′, conductors 6 and 6′, and electrode activators 7 and 7′. The main electrodes 1 and 1′ are airtightly attached to their corresponding end openings of the insulating cylinder 3, so that the inner end faces of the main electrodes 1 and 1′ are opposed to each other to form discharge surfaces which define a discharge gap inside the insulating cylinder 3. The intermediate electrode 2, airtightly attached to the insulating cylinder 3, has a discharge surface portion with a substantially T-shaped section which coaxially surrounds the space between the discharge surfaces of the main electrodes 1 and 1′ and faces the peripheral surfaces of the main electrodes 1 and 1′ to define the discharge gaps A. The electrode activators 7 and 7′, formed of a metal oxide such as magnesium oxide with a low work function (low electron emission work), are arranged in the cavities 4 and 4′ in the substantially central portions of the discharge surfaces of the main electrodes 1 and 1′ and/or in the grooves 5 and 5′. Thus, the electrode activators 7 and 7′ are isolated from the opposed discharge surfaces of the main electrodes 1 and 1′ and wide discharge surfaces (with axial length B) defined by those portions of the peripheral surfaces of the main electrodes 2 and 1′ which face the intermediate electrode 1. The grooves 5 and 5′ are isolated from the discharge surface portions with the axial length B on the peripheral surfaces of the main electrodes 1 and 1′. In FIG. 1, the conductors 6 and 6′ are formed of elongated conductive members which extend on and along the inner wall surface of the insulating cylinder 3 between the main electrodes 1 and 1′ and the intermediate electrode 2 in the axial direction of the insulating cylinder 3. The conductors 6 and 6′ prevent the start delay of the discharging operation between the main electrodes 1 and 1′ and the intermediate electrode 2. In this embodiment, the conductors 6 and 6′ are insulated from any of the main and intermediate electrodes. Alternatively, however, the conductors may be set in electrical contact with one of the main electrodes 1 and 1′ or with the intermediate electrode 2.

The operation of one embodiment of this invention will now be described.

Let it be supposed that the main electrodes 1 and 1′ in FIG. 1 are connected individually between terminals of an apparatus to be protected by the arrester. As in the prior art arrester of this type, if an abnormal overvoltage such as a surge is produced in the lines, discharge is effected between the main electrodes 1 and 1′ and the intermediate electrode 2 to absorb the surge or other abnormal overvoltage, thereby protecting the apparatus to be protected.

If a surge with a relatively long discharge time flows into the operating arrester for some reason or other, the arrester will undergo continuous discharge. As a result, the main electrodes 1 and 1′ are melted by the heat generated by the resultant discharged current. The melted matter short-circuits the discharge gaps A between the main electrodes 1 and 1′ and the intermediate electrode 2, establishing an electrode short-circuit mode. Thus, the arrester is prevented from burning, and the to-be-protected apparatus and the body of its user are perfectly protected against a surge.

In this case, if the electrode activators are arranged on the overlapping portions of the electrodes, as in the prior art arrester stated in West German Pat. No. 3,100,924, the electrodes cannot easily be melted by the heat generated by the discharge current since the work functions of the electrodes are low. In the case of this prior art arrester, therefore, even though a surge with a relatively long discharge time flows into the arrester to cause continuous discharge, the electrodes normally will not be melted by only the heat generated by the discharge current. Thus, the prior art arrester will be burned to undergo an open breakdown. It is, therefore, very difficult for the conventional arrester to have a short-circuit breakdown unless the arrester is covered with a cup-shaped short bar.

According to this invention, on the other hand, the electrode activators 7 and 7′ are located in the positions isolated from the discharge surfaces, so that the electrodes are quickly melted by the heat attributed to the discharge current produced by continuous discharge, securely establishing the electrode short-circuit mode.

For a more reliable establishment of the electrode short-circuit mode, according to the invention, the width A of the discharge gaps and the axial length B of each of the discharge surface portions of the intermediate electrode 2, overlapping the lateral faces of the main electrodes 1 and 1′, should preferably have a relationship B >A or at least B =A. It is to be understood that the relationship between the dimensions A and B can suitably be set according to, e.g., the discharge current of the arrester or the material, size and shape of the electrodes.

Figure 2:
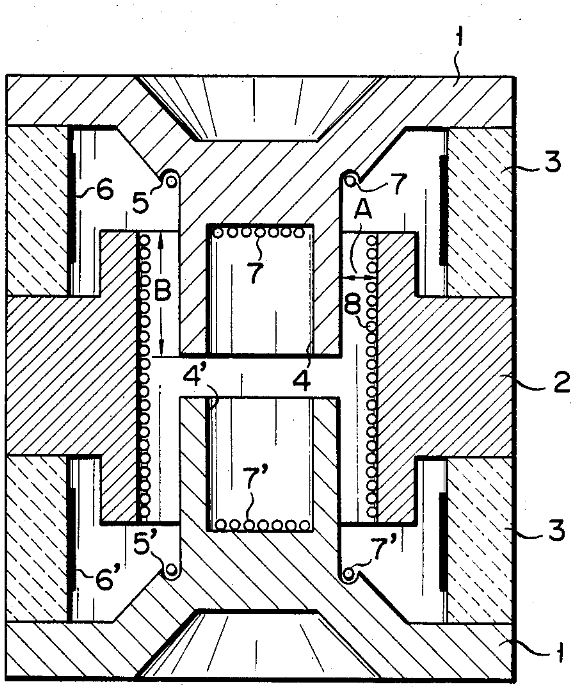
FIG. 2 is a vertical sectional view showing the construction of a gas-filled gap type arrester according to another embodiment of the invention.

FIG. 2 shows the construction of an arrester according to another embodiment of this invention. In FIG. 2, like reference numerals are used to designate like portions shown in FIG. 1, and a detailed description of those portions is omitted. The second embodiment shown in FIG. 2 differs from the first embodiment in that the cavities 4 and 4′, formed in the substantially central portions of the discharge surfaces of the main electrodes 1 and 1′ shown in FIG. 2 to hold the electrode activators 7 and 7′, are deeper than the ones shown in FIG. 1, and that electrode activators 8 are arranged on the discharge surface of the intermediate electrode 2 which faces the peripheral surfaces of the main electrodes 1 and 1′. In the first embodiment shown in FIG. 1, no electrode activators are arranged either on the discharge surfaces of the main electrodes 1 and 1′ or on the discharge surface of the intermediate electrode 2 which faces the peripheral surfaces of the main electrodes 1 and 1′. Alternatively, the electrode activators may be arranged on any of the discharge surfaces of the main and intermediate electrodes. In the second embodiment shown in FIG. 2, the electrode activators 8 are arranged over the whole discharge surface of the intermediate electrode 2. According to the embodiment shown in FIG. 2, although the discharge withstanding current rating of the discharge surfaces is increased, the main electrodes 1 and 1′ without the electrode activators 8 on their discharge surfaces are melted by the heat attributed to the discharge current produced by a continuous discharge, thus establishing the electrode short-circuit mode. In this case, the depth of the cavities 4 and 4′ in the discharge surfaces of the main electrodes 1 and 1′ is equal to or greater than the axial length B of each of those portions of the discharge surface of the intermediate electrode 2 which overlap with the lateral faces of the main electrodes 1 and 1′. Accordingly, the main electrodes 1 and 1′ are melted more securely, so that the electrode short-circuit mode is established with improved reliability. A description of other arrangements and functions of the second embodiment of FIG. 2 is omitted since they are the same as those of the first embodiment shown in FIG. 1.

According to this invention, as described above, there is provided an arrester which comprises a pair of cylindrical main electrodes and an intermediate electrode coaxially surrounding the space between the main electrodes and facing the peripheral surfaces of the main electrodes to form discharge surfaces. In this arrester, electrode activators are arranged in positions isolated from the discharge surfaces or on one of the discharge surfaces, whereby an electrode short-circuit mode is established by heating with use of the discharged current of the arrester. Thus, accidents may securely be prevented from being caused by burning of the arrester. As compared with the prior art arrester covered with a cup-shaped short bar, the arrester of the invention is reduced in the number of components used therein and in overall size, and can settle all the problems involved in the fusion of fuses.

What is claimed is:

1. A discharge-type arrester comprising:

an insulating cylinder; p1 a pair of cylindrical main electrodes airtightly attached to corresponding openings of the insulating cylinder so that the inner end faces of the main electrodes are opposed to each other to form discharge surfaces which define a discharge gap in the insulating cylinder;

an intermediate electrode having a discharge surface coaxially surrounding the space between the discharge surfaces of the main electrodes and facing the lateral faces of the main electrodes to define additional discharge gaps; and electrode activators arranged over the whole discharge surface of the intermediate electrode so as to be isolated form the discharge surfaces of the main electrodes.

2. A discharge-type arrester comprising:

an insulating cylinder;

a pair of cylindrical main electrodes airtightly attached to their corresponding openings of the insulating cylinder so that the inner end faces of the main electrodes are opposed to each other to form discharge surfaces which define a discharge gap in the insulating cylinder;

3. The discharge-type arrester according to claim 1 or 2, wherein the relation between the width A of the discharge gaps, defined between the lateral faces of the main electrodes and the intermediate electrode and the axial length B of those portions of the discharge surface of the intermediate electrode which overlap the lateral faces of the main electrodes, is given by $B \geqq A$.

4. The discharge-type arrester according to claim 1 or 2, wherein said electrode activators are formed of a metal oxide such as magnesium oxide.

5. The discharge-type arrester according to claim 1 or 2, further including at least one elongated conductor extending on and along the inner wall surface of the insulating cylinder between the main electrodes and the intermediate electrode in the axial direction of the insulating cylinder.

* * * * *